United States Patent
Bazarian et al.

(10) Patent No.: US 6,217,681 B1
(45) Date of Patent: Apr. 17, 2001

(54) METHOD FOR OXYGEN-ENHANCED COMBUSTION USING A VENT STREAM

(75) Inventors: Edward Robert Bazarian, Allentown; Charles Edward Baukal, Jr., Harleysville; Prince Boyd Eleazer, III, Allentown; Bruce Kyle Dawson, Bethlehem, all of PA (US); Robert Dean Marchiando, Twinsburg, OH (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/059,580

(22) Filed: Apr. 14, 1998

(51) Int. Cl.⁷ ........................................ C22C 1/04
(52) U.S. Cl. ............... 148/688; 148/549; 65/17.1
(58) Field of Search ................... 148/549, 688; 65/17.1

(56) References Cited

U.S. PATENT DOCUMENTS 4,498,971 * 2/1985 Angelov et al. .
4,797,087    1/1989  Gitman .
5,217,363    6/1993  Brais et al. .
5,308,239    5/1994  Bazarian et al. .
5,388,645    2/1995  Puri et al. .
5,454,712   10/1995  Yap .
5,459,994   10/1995  Drnevich .
5,611,683    3/1997  Baukal, Jr. et al. .

FOREIGN PATENT DOCUMENTS

265212 A1    2/1989  (DE) .
19535370 A1  3/1997  (DE) .
0474198 B1   3/1992  (EP) .
2067668      7/1981  (GB) .

* cited by examiner

Primary Examiner—John Sheehan
(74) Attorney, Agent, or Firm—Robert J. Wolff

(57) ABSTRACT

Oxygen-enhanced combustion in a manufacturing plant using a nitrogen plant to obtain a nitrogen product stream for use in the plant is effected by utilizing the oxygen-rich vent, waste, or exhaust stream as the primary source of oxidant for combustion of fuel in burners used to heat furnaces and the like in the same plant. Processes according to the invention employ a vent stream in place of a high purity oxygen stream for oxy-fuel combustion, oxygen lancing, and oxygen boosting.

8 Claims, 3 Drawing Sheets

METHOD FOR OXYGEN-ENHANCED COMBUSTION USING A VENT STREAM

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention pertains to oxygen-enhanced combustion utilizing the vent, exhaust or waste stream from an associated air separation facility utilized to produce a nitrogen product stream, e.g. a cryogenic air separation plant.

BACKGROUND OF THE INVENTION

It is well known in the art to produce nitrogen via liquefaction and distillation of air. In a number of industrial processes nitrogen is utilized for purposes such as inerting, annealing during metal production, inerting tin baths during flat glass production and the like. In these operations it is conventional to have a nitrogen plant to satisfy the nitrogen requirements for the overall process. Conventional technology used to separate nitrogen from the air produces a vent stream that is oxygen rich and is usually vented to the atmosphere.

It is also known that in order to improve productivity and thermal efficiency of heating and melting processes, oxygen enhanced combustion is a valuable tool. Oxygen has been proven to provide a variety of benefits in combustion processes namely, increased productivity and fuel efficiency, reduced flue gas volume and pollution emission, and the like. Oxygen has been used in many ways to enhance existing air/fuel-fired combustion processes which fall into five broad categories, namely: enriching combustion air (sometime known as pre-mix or enrichment); lancing oxygen into air/fuel flames (lancing); combining an oxy-fuel burner together with an air/fuel burner (air-oxy/fuel); adding to and/or replacing some of the existing air/fuel burners with oxy/fuel burners (boosting); and complete replacement of all air/fuel burners with oxy/fuel burners (oxy/fuel). Although oxy/fuel typically results in the greatest benefit it usually comes at the highest cost to the user.

One technique of enhanced combustion is the use of intermediate purity oxidizers with a conventional burner. U.S. Pat. Nos. 4,797,087, 5,217,363, 5,308,239, 5,611,683 and 5,454,712 all involve processes using air and oxygen in a burner to produce an intermediate overall enrichment level. None of these patents disclose the use of a single oxidizer with an intermediate oxygen composition.

UK Patent Application 2 067 668 A describes a process wherein an air separation plant feeds oxygen to a coal gasification unit to produce a medium BTU fuel gas and feeds nitrogen into the incoming combustion air of a gas turbine. The fuel gas and oxygen deficient air (which is used to reduce NOx compared to normal air) are then fed into a gas turbine.

U.S. Pat. No. 5,388,645 discloses a process where an oxygen-containing gas (e.g. air) is separated into oxygen-enriched and oxygen-depleted streams. The oxygen depleted stream is injected into methane-containing solid carbonaceous subterranean formations to produce a methane-containing gaseous mixture which is referred to as coalbed methane. The oxygen depleted stream reduces corrosion and minimizes the chances for explosion when compared to a similar process using air. The oxygen-enriched stream is reacted with an oxidizable material, which could be methane containing steam. Using both streams improves the economics of the recovery process.

U.S. Pat. No. 5,459,994 describes a process wherein an air separation plant (ASU) is coupled with a gas turbine so that the nitrogen-rich air stream (85 to 100% nitrogen) from the air separation unit is added to the incoming combustion air stream of the turbine to reduce NOx emissions by using an oxidant with a lower oxygen concentration than that found in air. The process also increases the power output and thermal efficiency of the turbine because of the additional volume and pressure head of the nitrogen-rich stream. The oxygen-rich stream (80 to 100% oxygen) is used in a coal-gasification process to produce a fuel gas for use in the turbine.

European Patent Publication 0 474 198 B1 describes a process for improving the waste burnout and reducing emissions in a waste incinerator. Waste is fed into the incinerator onto a slanted grate. The main combustion zone has primary combustion air plus pure oxygen injected into it to produce oxygen-enriched air which includes utilization of up to and including pure oxygen, which is fed through the grate to improve burnout. The second part of the grate, known as the burnout zone has an inert gas, such as nitrogen blended into the secondary air stream. The nitrogen and oxygen may come from an air separation plant. The actual content of the secondary air stream is adjusted from being oxygen-deficient to oxygen-rich, depending upon the contents of the exhaust stream coming from the primary combustion zone. Adjustment of the oxygen content of the secondary stream is used to control the combustion intensity.

U.S. Pat. No. 4,460,558 discloses utilization of high purity oxygen and fuel reacted to produce carbon black where the waste gas nitrogen stream is also used downstream of the process to recover heat and as a purge to a dryer.

U.S. Pat. No. 5,069,692 discloses and claims a process for an aircraft system where an oxygen rich stream from an air separation unit is used for a combustor and a nitrogen rich stream is used for fuel tank safety to pump the fuel.

U.S. Pat. No. 5,076,837 discloses and claims a process for using both streams from an air separation unit where the oxygen rich stream is used in a chemical process (e.g. gasification) and a nitrogen rich stream is preheated by the exhaust products from the chemical process and then the preheated nitrogen is used to preheat one of the incoming chemicals for the chemical process.

Japanese Patent Application H8-285219 describes a process wherein high purity oxygen produced by a pressure swing adsorption oxygen generator is supplied to a burner and the nitrogen rich exhaust from the pressure swing adsorption apparatus is blended with the exhaust gases to be used to preheat the incoming raw materials and also to dilute the concentration of pollutants in the exhaust products.

The process in U.S. Pat. No. 4,827,716 utilizes the nitrogen which is the primary product stream from an air separation unit carried on board an aircraft to inert the fuel tanks while the oxygen rich stream produced by the same unit is used as an oxidant to drive an emergency power unit on the aircraft.

SUMMARY OF THE INVENTION

In its broadest aspect the present invention pertains to an improvement in the production of high purity nitrogen by separation from air in a nitrogen plant located proximate to a manufacturing operation using oxy-fuel and/or air fuel burners by operating the nitrogen plant to produce a nitrogen product stream and an oxygen-rich vent stream, utilizing the nitrogen product stream in the manufacturing operation and utilizing the oxygen-rich vent stream in the manufacturing operation to perform one of enrichment of combustion air, lancing air-fuel flames, in an oxy-fuel burner as the oxygen source and support of one or all air-fuel burners used in heating and combustion thereof.

In this aspect of the invention the nitrogen plant is operated to produce a vent, exhaust, or waste stream having, by volume, 40–90% oxygen, balance nitrogen, atmospheric gases and impurities such as CO2 and H2O.

In this aspect of the invention the nitrogen product stream can be used to inert the tin bath of a flat glass plant and the oxygen-rich vent stream can be used in a combustion apparatus associated with melting of glass for the flat glass plant.

Preferred devices for use with the oxygen-rich vent stream are oxy-fuel burners.

In another aspect of the present invention the nitrogen product stream can be used for annealing furnaces in an aluminum manufacturing plant and the oxygen-rich vent stream can be used in the melting operation in the plant.

In this aspect of the invention the preferred apparatus for use in the melting operations is an oxy-fuel burner.

In either aspect, according to the present invention, high purity oxygen can be blended with the oxygen-rich vent stream to further increase the oxygen capacity of the stream.

DETAILED DESCRIPTION OF THE INVENTION

Oxygen has been proven to provide a variety of benefits in combustion processes, for example, increased productivity and fuel efficiency, reduced flue gas volume and pollution emissions, and the like. Oxygen has been used to enhance existing air/fuel-fired processes by a number of techniques which are: enriching the combustion air, lancing oxygen into air/fuel flames, using an oxy-fuel burner together with an air/fuel burner, adding to and/or replacing some of the existing air/fuel burners with oxy-fuel burners, and completely replacing all the air/fuel burners with oxy-fuel burners. Although oxy-fuel typically gives the greatest benefits, it usually has the highest cost. It has been found that most of the benefits of using oxygen-enhanced combustion can be achieved with oxidizers containing 40–90% oxygen and the incremental benefits achieved by going to higher purity oxygen are relatively small.

Processes according to the present invention show tremendous commercial potential because the oxygen-rich vent stream from a plant used to separate nitrogen from the air, e.g. a cryogenic nitrogen plant, is exhausted to the atmosphere and not utilized in any manufacturing operation. Potential benefits to the user can be large because of the potential for lower cost oxygen than is currently available. The processes of the present invention create a bridge between going from air/fuel to oxy-fuel combustion.

Figure 1:
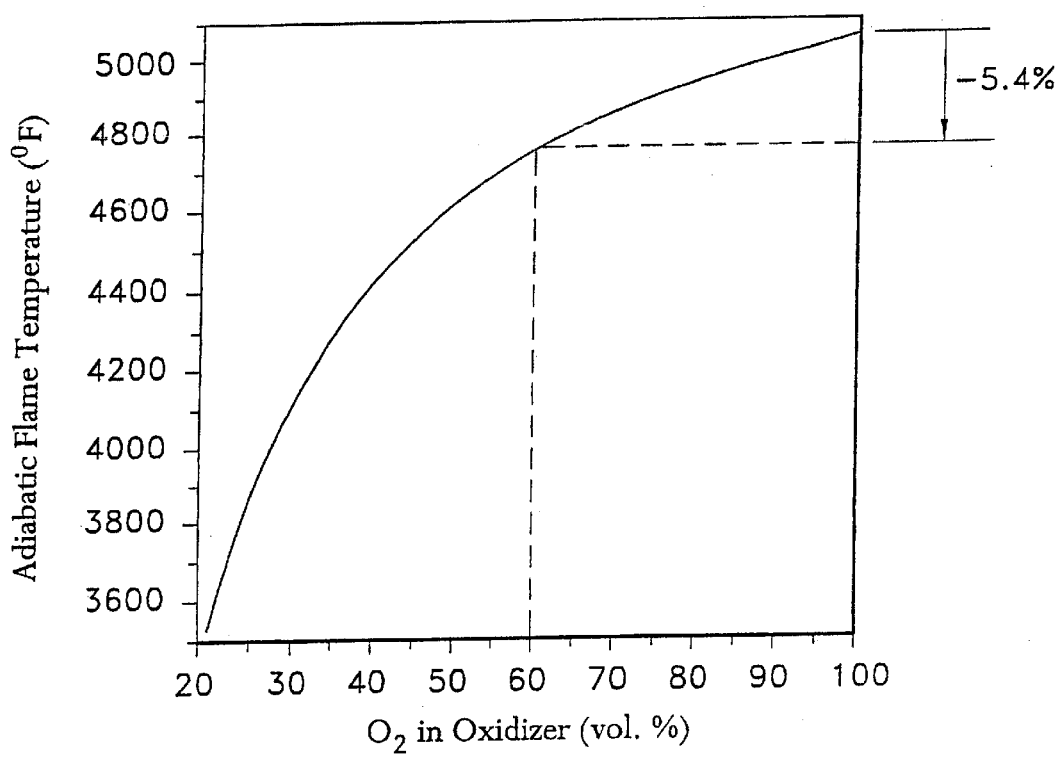
FIG. 1, is a plot of adiabatic equilibrium flame temperature for a stoichiometric methane flame as a function of the oxygen content of the oxidizer consisting primarily of oxygen and nitrogen.

FIG. 1, shows that there is only a 5.4% decrease in the adiabatic absolute flame temperature for a stoichiometric flame using an oxidizer containing 60% oxygen and 40% nitrogen by volume, compared to the temperature of the flame using 100% oxygen in the combustion processes. Although there is a 40% decline in oxygen purity, the decline in flame temperature is relatively small. However, there is a 30% increase in the flame temperature when using an oxidizer containing 60% oxygen as compared to using air as the oxidizer. The adiabatic flame temperature thus is an indirect measure of the productivity of a given combustion system.

Another indirect way of comparing thermal efficiency of combustion processes is by measuring the amount of available heat. Actual energy efficiency is dependent on many factors, including the furnace size and shape, thickness and composition of the refractory, the number and size of openings in the furnace, the heat load characteristics, the type of process, e.g. batch or continuous, and the like. Available heat is defined, for the purposes of this disclosure, as the gross heating value of the fuel less the heat content of the exhaust gases which is a function of the exhaust gas temperature.

Figure 2:
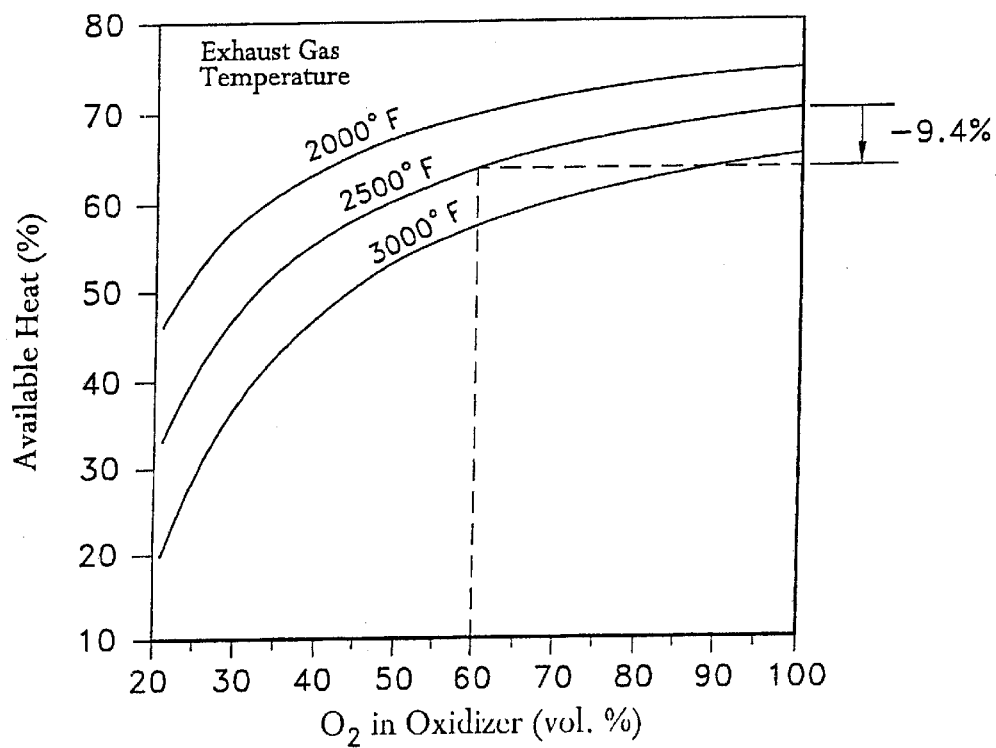
FIG. 2, is a plot of available heat for a stoichiometric methane flame as a function of the oxygen content of the oxidizer consisting essentially of oxygen and nitrogen and of the exhaust gas temperature.

FIG. 2, shows that the reduction in the available heat for a stoichiometric combustion process using an oxidizer containing 60% oxygen and 40% nitrogen and having an exhaust gas temperature of 2500° F. is only 9.4% less than the process using an oxidizer containing 100% oxygen. A large change in oxygen purity has only a limited effect on thermal efficiency. However, the available heat increases 92% by using an oxidizer containing 60% oxygen when compared to using air as the oxidizer.

Figure 3:
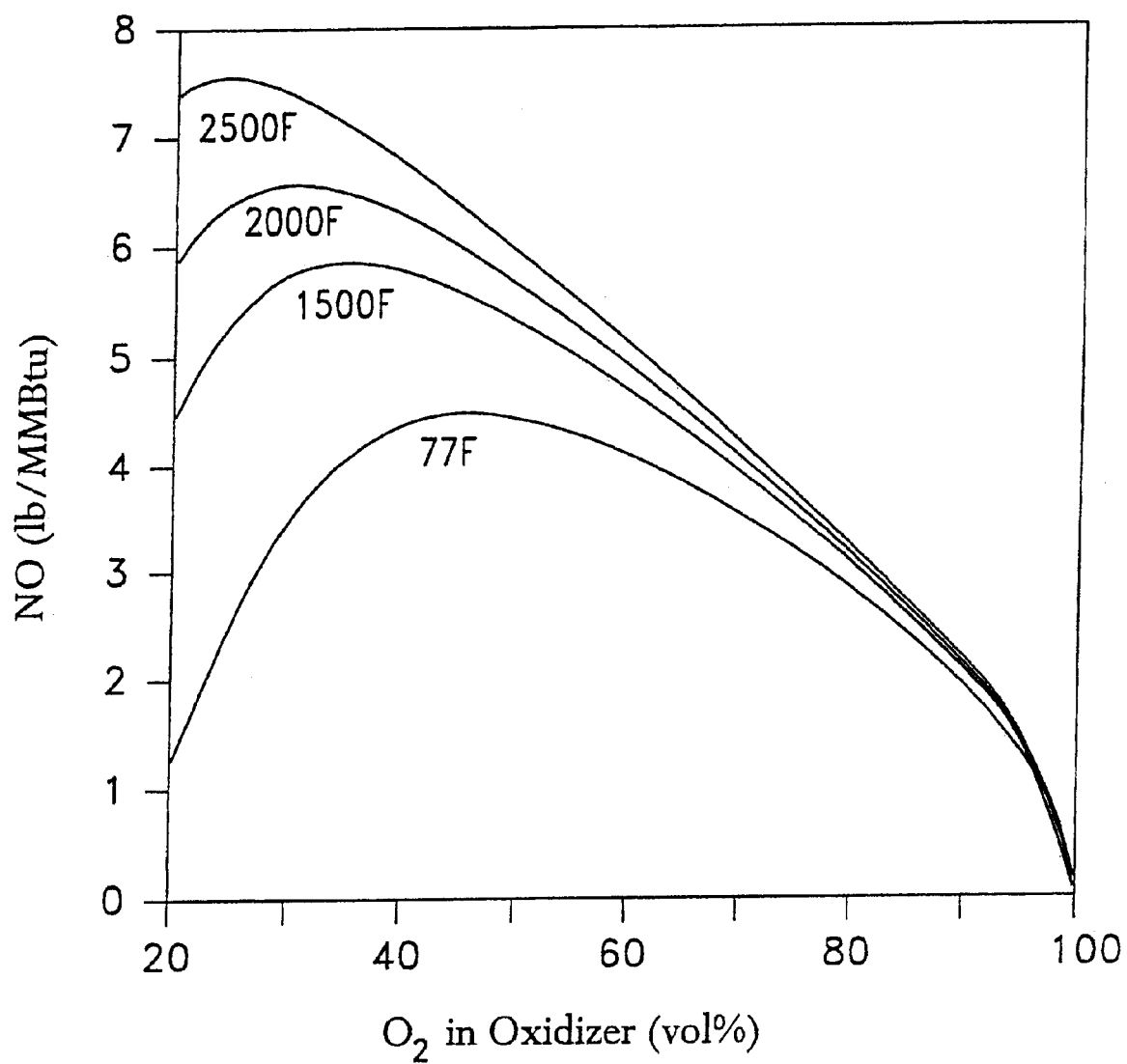
FIG. 3, is a plot of adiabatic equilibrium NO content in the exhaust products of a stoichiometric methane flame as a function of the oxygen content of the oxidizer (which consists of air blended with pure oxygen) and of the air preheat temperature with the oxygen at 77° F.

Pollutant emissions from combustion processes are of considerable concern today because of the deleterious effect on the environment and because of strict regulations governing these emissions. NOx emissions (typically NO and $NO_2$) are regulated due to their effects on global warming and acid rain. In high temperature combustion processes, the NOx consists almost entirely of NO (nitric oxide) and only trace amounts of $NO_2$ (nitrogen dioxide). FIG. 3 shows predictive NO emissions (normalized to a unit gross firing rate of $1 \times 10^6$ BTU) for the stoichiometric equilibrium combustion of methane as a function of the oxidizer composition (oxygen plus nitrogen) and as a function of the air preheat temperature. For these calculations, the oxidizer was produced by blending preheated air (21% oxygen, 79% nitrogen by volume) with ambient temperature (77° F.) gaseous oxygen. FIG. 3 shows that the emissions are lowest for pure oxygen combustion due to the absence of any nitrogen in the system to form NOx. Thermal NOx is exponentially dependent on the gas temperature and is also a function of the oxygen and nitrogen concentrations in the gas. When the oxidizer is ambient air, the NOx emissions are relatively low because of the lower flame temperatures, even though there is plenty of nitrogen in the exhaust products. As the oxygen concentration in the oxidizer increases above that in the air (e.g. above 21%), NO rapidly increases due to its exponential dependence on temperature, even though nitrogen is being taken out of the oxidizer. A peak in NOx is reached at about 45% and then the NOx begins to decline because the reduction in the amount of nitrogen supercedes the gas temperature which is still rising. When the air is preheated, NOx increases dramatically because not only is there a high concentration of nitrogen but the flame temperature has also increased significantly. Typical regenerative glass furnaces have air preheat levels of about 2000° F. NOx emissions would be expected to increase with oxy/fuel boosting in a non-preheated air/fuel combustion system because of the increase in the overall enrichment level of the combined oxidizer (air plus oxygen from boosting). As seen in FIG. 3 only a small increase in the oxygen in the oxidizer above that in the air causes NOx to rapidly increase. However, when oxy/fuel boosting is used with a preheated air system, the change in NOx is relatively small because of the high base line NOx from the preheated air. Therefore, the use of lower purity oxygen from the vent stream of a cryogenic plant should not have a significant impact on NOx formation. Field trials using the disclosed invention actually showed a slight reduction in NOx in a glass melting furnace using air preheated to 2000° F.

The process of the present invention can be utilized at any location where a nitrogen plant with a waste stream containing an average purity of 40–90% oxygen is proximate to a combustion process. Potential applications include flat glass production where a nitrogen plant is used to produce nitrogen to inert the tin bath and oxygen can be used to enhance the melting of glass, sheet aluminum processes that use nitrogen plants to generate nitrogen for annealing and can also use oxygen to enhance the melting operation, and chemical and petroleum processes where the nitrogen-rich stream can be used for inerting while the oxygen-rich stream can be used in combustion applications like catalytic crackers or sulfur recovery units.

According to the present invention the oxygen-rich vent stream from a nitrogen plant is used in a combustion system to enhance its performance which is compared to conventional air/fuel burners. The vent stream from a nitrogen plant has not previously been used as an oxidant in an oxy/fuel burner.

A key aspect of the present invention is the use of a vent stream from a nitrogen plant that may already exist, not changing or redesigning or providing a new dual-cycle air separation unit which would specifically generate nitrogen-rich and oxygen-rich streams for dual use in a manufacturing process. The oxygen-rich stream that is currently vented from a standard nitrogen plant could be enriched with liquid oxygen if higher purity oxygen is required. It also could be diluted with air if more oxygen molecules are required and a lower overall oxygen purity is acceptable.

Figure 4:
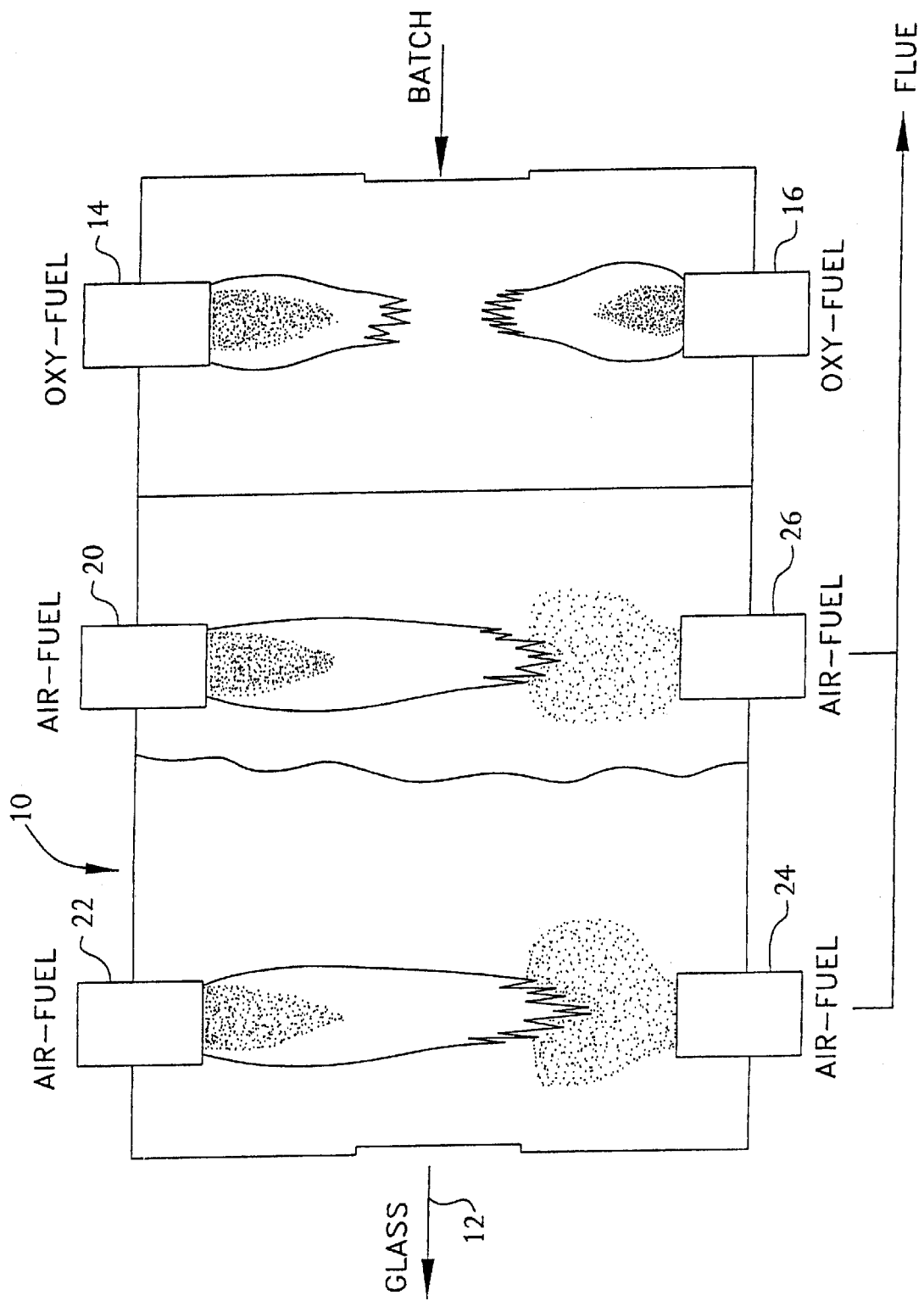
FIG. 4, is a schematic representation of an oxy-fuel boosting system utilizing the present invention.

One such application of the present invention is shown in FIG. 4, which shows a furnace 10 used to produce a glass product 12 for a flat glass manufacturing operation. As shown in FIG. 4, oxy-fuel burners 14 and 16 are used at the batch or entry end of the furnace 10 to enhance the existing air fuel combustion process. Burners 20, 22, 24 and 26 are conventional air fuel burners as are well known in the art. Using oxy/fuel boosting as shown in FIG. 4 provides increased productivity for a low capital cost, improved quality and fuel efficiency, reduced NOx and particulate carry over, extended furnace life and improved furnace pressure and batch pattern control.

Tests were run in an existing flat glass manufacturing plant wherein oxy-fuel flames were produced at purities varying from 100% oxygen down to 60% oxygen. There were no significant changes in the visible flame and thermal radiation measurements yielded similar results. There was no reduction in the melt rate after reducing the oxidizer purity from 100% to 60%, with only a 2.5% increase in the is overall firing rate.

From the foregoing, it is apparent that the use of decreasing oxygen purity did not adversely affect the process since the decrease from 100% oxygen led to, initially, the same productivity as evidenced by the furnace pull rate measured in tons per day to increasing furnace pull rates at the end of the test. NOx was reduced by about 1% using 60% oxygen purity compared to 100% oxygen purity. NOx was reduced by 3.5% using 60% oxygen purity in boosting compared to no boosting conditions.

From the foregoing it is apparent that a heretofore unused vent stream from a nitrogen plant can be utilized to enhance combustion processes.

The present invention also encompasses the use of any vent stream having equivalent or similar oxygen content or characteristics. For example use of a pressure swing, vacuum swing or membrane plant used to separate nitrogen from the air that would have a vent, exhaust, or waste stream containing at least 40–90% oxygen by volume would be within the scope of the invention.

Having thus described our invention what is desired to be secured by letters patent of the United States is set forth in the appended claims.

What is claimed:

1. In the production of gaseous nitrogen by separation of the nitrogen from air in a nitrogen plant located proximate one of a glass or aluminum manufacturing operation using one of oxy-fuel combustion processes, air-fuel combustion processes, or a combination of oxy-fuel combustion and air-fuel combustion processes to provide heating for primary melting of one of glass or aluminum the improvement comprising:

operating the nitrogen plant to produce a high purity nitrogen product stream and an oxygen-rich vent stream, said oxygen rich vent stream containing between 40 and 90% oxygen, balance nitrogen, atmospheric gases, carbon dioxide and water; and utilizing the oxygen-rich vent stream in said manufacturing operation as said oxygen source in said oxy-fuel combustion processes or enrichment oxygen in said air-fuel combustion processes to provide heating for primary melting of one of said glass or aluminum.

2. A process according to claim 1 including the step of using a conventional cryogenic air separation plant to produce nitrogen by liquefaction and fractional distillation of air.

3. A process according to claim 1 including the step of removing a nitrogen product stream from said nitrogen plant and inerting a tin bath in a flat glass plant and using the oxygen-rich vent stream in a combustion apparatus associated with melting of glass for said flat glass plant.

4. A process according to claim 1 including the step of removing a nitrogen product stream from said nitrogen plant and using said nitrogen product stream for annealing furnaces in an aluminum manufacturing plant and using said oxygen-rich vent stream in a melting operation in said plant.

5. A process according to claim 4 including the step of replacing at least one conventional burner with an oxy-fuel burner in said melting operation.

6. A process according to claim 1 including the steps of blending gaseous oxygen with said oxygen rich vent stream to increase the available oxygen content of said vent stream.

7. A process according to claim 1 including the step of removing a nitrogen product stream from said nitrogen plant and inerting a chemical process and using said oxygen-rich stream in a related combustion process in said chemical plant.

8. A process according to claim 1 including the step of using said nitrogen product for inerting a petroleum process and using said oxygen-rich stream for a combustion processes in one of catalytic crackers, sulfur recovery units or both in said petroleum plant.

* * * * *